Sept. 16, 1958 E. H. MUDERSBACH 2,852,234
ROTARY REGENERATIVE PREHEATERS FOR GASEOUS MEDIA
Filed March 8, 1954 2 Sheets-Sheet 1
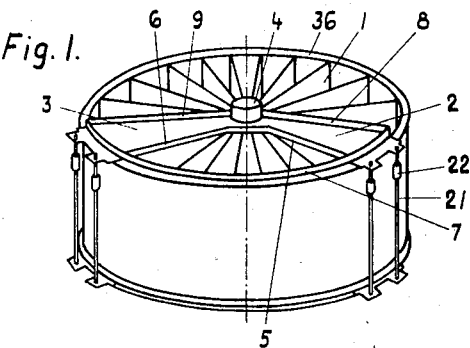
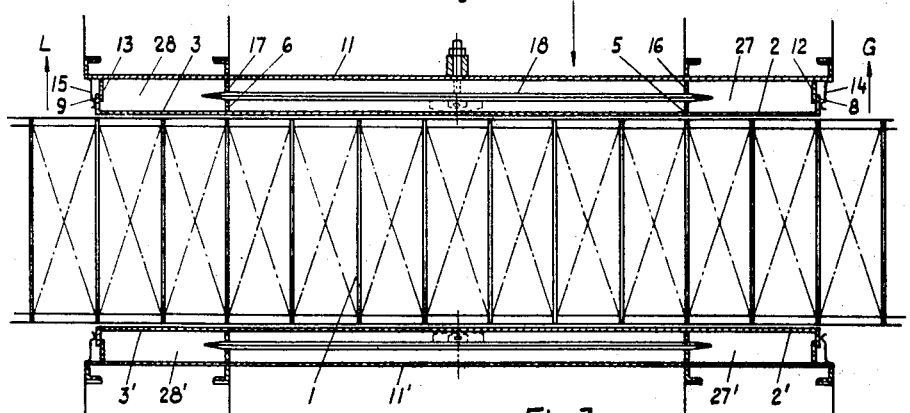
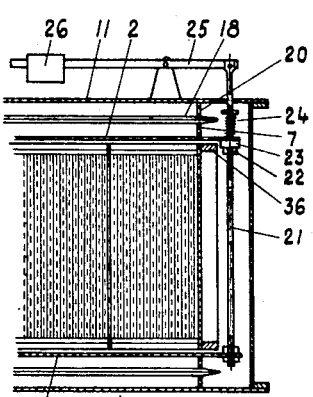
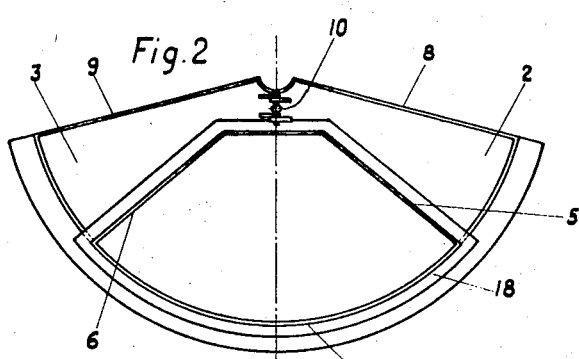
INVENTOR
Ernst Heinrich Mudersbach
BY
his Attorney United States Patent Office 2,852,234
Patented Sept. 16, 1958

2,852,234
ROTARY REGENERATIVE PREHEATERS FOR GASEOUS MEDIA

Ernst Heinrich Mudersbach, Heidelberg, Germany, assignor, by mesne assignments, to Svenska Rotor Maskiner Aktiebolag, Nacka, Sweden, a corporation of Sweden Application March 8, 1954, Serial No. 414,852

16 Claims. (Cl. 257—6)

This invention relates to rotary regenerative preheaters for gaseous media as for example utilized in heat power plants for preheating the combustion air by means of the hot flue gas. The main difficulty in such preheaters is that the two channels or ducts through which the heat emitting and the heat absorbing media flow are to be sealed off from one another, so that an over-flow of medium from one channel to the other is prevented. Several proposals have already been made to obtain this result as far as possible, the problem often being solved by applying different proposals simultaneously in order to obtain a cooperation of their effects.

The problem is especially difficult when the preheater, due to high capacity has large dimensions so that the heat expansion per se amounts to high values and also results in irregular distortions and warping of the rotor as its temperature rises relative to idle condition and also due to the fact that the temperature will constantly vary somewhat during operation.

One solution, taking the above mentioned distortion of the rotor especially into consideration, provides for movable plates located between the rotor end face and the stationary housing end walls and sealing off the transition zones of the rotor for separating the two main channels. The movable plates are adapted to adjust themselves to distortions of the rotor which arise under normal operating conditions due to heat expansion of the rotor.

The rotary regenerative preheater according to the invention comprises a development of this form of sealing and is characterised by the fact that, on the two edges of the sector plates limiting one of the two channels and facing each other, sealing strips are provided at each end face of the rotor, said sealing strips running together near to the rotor shaft and being at their outer ends connected by means of a peripheral sealing strip extending along the circumference of said channel, whereas also a closed line of corresponding sealing strips is provided on the end wall of the stationary housing in such a way that said two lines of sealing strips sealingly enclose the passing channel all around its circumference.

In the case of a preheater for heating air by means of hot flue gas when the included central angle of the air channel is smaller than that of the flue gas channel it is then advantageous to arrange the above sealing strips around the smaller or air channel. To improve the sealing the outer edges of the sector sealing plates may additionally be provided with sealing strips which also run together in the proximity of the shaft and with their outer portions end at the correspondingly extended peripheral sealing strip, corresponding strips also being fixed to the end walls of the stationary housing. In this way chambers closed at all sides will be formed on the outer sides of the sector sealing plates, each chamber being limited at one side by the sector plate itself and on the opposite side by the adjacent surface of the housing end wall and at its circumference by the two lines of sealing strips.

To illustrate the inventive idea an embodiment is shown in the drawing.

Fig. 1 shows a preheater according to the invention in a diagrammatic perspective view to clearly illustrate the most important features, the housing being omitted for the sake of simplicity.

Fig. 2 shows a plan view of the sealing arrangement.

Fig. 3 shows a developed vertical section through the preheater along a cylindrical section surface close inside the rotor jacket and concentric to the rotor shaft.

Fig. 4 is a vertical radial section of the preheater including the housing which however is limited to the circumferential portion.

Figure 5:
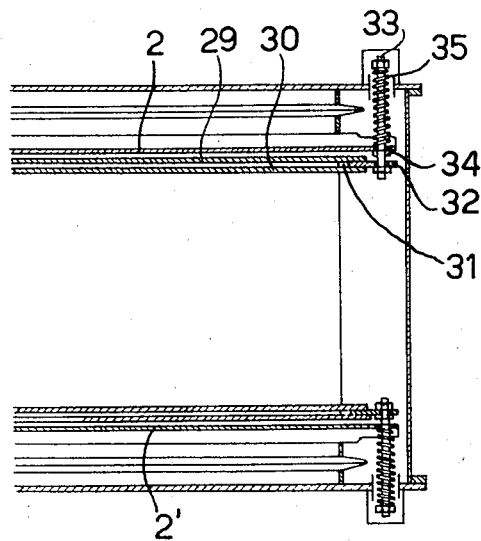
Fig. 5 shows a similar vertical section of a modified embodiment.

In Fig. 1 the rotor is divided by radial separating walls 1 into sector shaped compartments. Above the upper end face of the rotor sealing plates 2 and 3 are arranged in a manner known per se to separate the two channels from each other and to close the dead portions of the rotor in these transition zones. The corresponding sealing plates 2' and 3' at the lower end face of the rotor are not seen in this view. These sector shaped sealing plates are supported near to the shaft 4 of the rotor and so that on this support they may pivotally lower or rise to follow the warpings of the rotor during drive.

It is to be assumed that the small front channel illustrates the air channel and the larger rear channel is the flue gas channel.

The main feature of the invention comprises the sealing strips 5 and 6 at the inner edges of the sealing plates 2 and 3, respectively, and also the sealing strip 7 at which the first mentioned strips end. These three sealing strips thus form an unbroken line entirely enclosing the through-passing air channel.

To obtain a more effective sealing the two sealing plates 2 and 3 are not only here but also at their outer radial edges, provided with sealing strips 8 and 9, which also near to the shaft run together and at the circumference are connected with the correspondingly extended peripheral sealing strip 7, all of these substantially radial sealing strips 5, 6, 8 and 9, respectively, also providing simultaneously a reinforcement of the sealing plates 2 and 3.

Fig. 2 shows a plan view of the sealing arrangement. Here is also shown the pivot 10 which enables the sealing plates to be swung up and down. The circumferential connection between the sealing plates 2 and 3 is both long and resilient enough to take up different radial expansions of the two sealing plates so that as a rule a special joint will be unnecessary.

From the construction described it will appear that the sealing plates with their outer edges can also follow larger displacements of the rotor. In the proximity of rotor shaft 4, only small variations in the length of the shaft will be actual, that is, only somewhat equal differences between cold idle conditions, and the hot operating conditions. It is therefore only necessary at this point to accurately adjust the position of the sealing plates 2 and 3 and thus their distance to the adjacent rotor end surface only for the operating condition. The pivot 10 is therefore not rigidly connected with the stationary end plate of the housing but is adjustable upwardly and downwardly, for instance by means of a screw or a lever to be controlled from the outside.

The above mentioned upper end face of the rotor which during each revolution may swing up and down, is located opposite the stationary end surface 11 of the housing. To this end surface of the housing strips are also secured in exactly the same arrangement. As will be seen from Fig. 3 the outer strips 8 and 9 of the sealing plates 2 and 3, respectively, are placed opposite stationary strips 12 and 13 of the housing end plate, and accordingly said strips are placed in intimate proximity to each other, so that the strips of the movable plates may freely move upwardly and downwardly, while however maintaining a certain sealing effect. This sealing may be improved through the medium of additional sealing means and to this end spring plates 14 and 15 may be employed, one edge of which is secured to the stationary housing end plate 11 whereas the other edge resiliently and sealingly rests against the movable strips 8 and 9, respectively.

In the same manner the inner strips 5 and 6 of the sealing plates are fitted opposite the stationary strips 16 and 17 of the housing end wall. The effective sealing between cooperating strips however, in order to illustrate another possibility, is not attained by means of resilient strips but by the aid of a sealing cuff 18. This sealing cuff 18 which may be made of thin plate encloses the air channel, and also connects, as will be seen from Fig. 4, the peripheral strip 7 of the movable sealing device with the stationary peripheral strip 20 of the stationary housing end surface. One edge of the cuff is fixed to the edges of the movable strips and the other edge of the cuff is tightly secured to the stationary strips.

It will accordingly be evident that the air channel by means of this compensating cuff is tightly closed with regard to the adjoining chambers, such sealing furthermore being provided at the outer edges of the plates 2 and 3. On the other end face of the rotor the conditions are the same, as is evident particularly from Fig. 3.

In order to obtain an effective sealing it is necessary that the distance of the sealing plates 2 and 3 from the end surface of the rotor may be adjusted to the smallest possible value. This requires that the end surface of the rotor has a surface as exactly plane as possible. In order to obtain such surface the radial partition walls of the rotor which separate the various sectors from one another, as well as the present separating walls, pass with full wall strength through the total height of the rotor so that at the ends of the rotor they will be evenly connected with the peripheral flange 36. All of this end face is then preferably turned so that an exact plane surface is obtained.

The upper sealing plates 2 and 3 are connected in a manner known per se with the other sealing plates 2' and 3' located on the opposite end face of the rotor, and this is effected by means of connecting rods 21. The upper and the lower plates then follow each oher in parallel in their movements corresponding to the distortions of the rotor. By means of adjusting nuts 22 the lengths of the connecting rods 21 may be adjusted accurately, in order that at both of the end faces only an air slot as narrow as possible will be maintained between the sealing plates and the rotor end faces. From Fig. 4 it will be seen more clearly that the adjusting nut 22 acts on a stop 23 against the force of a spring 24 so that the stop 23 which determines the smallest distance between the sealing plates, nevertheless will permit when necessary a resilient yielding movement of the plate for increasing the distance. This may be important if larger foreign bodies pass through the apparatus, which if rigidly set, would probably cause damage to the preheater.

The interconnected sealing plates of each pair of plates are supported at one end of a double armed lever 25 the other end of which is loaded with a weight 26 which may be accurately adjusted.

In this manner the weight of the total sealing device is balanced, so that adjustments for fitting the rotor distortions will require only very small power. In spite of the effective sealing gas over-flow may, however, result from the different pressures in the channels and take place in those hollow chambers which are formed outside the sealing plates by the sealing plates themselves and corresponding surfaces of end walls of the housing. Pressure differences in the chambers 27, 27', 28 and 28', should then not be balanced by the weight 26. In order to avoid these drawbacks the chambers are brought into communication with one another so that the pressures may be equalized, and so that at least chamber 27 communicates with the opposite chamber 27' and on the other hand chamber 28 with chamber 28'. All of the four chambers may also be inter-connected for equalizing the pressures.

As the air channel is sealed along the entire circumference the flue gases may expand, without damage, over the other part of the preheater and, for instance, also fill up the circumferential chamber which is located between that rotor part bounding the air channel of the rotor outwardly and the adjacent housing jacket. There may also be provided a jacket sealing plate in addition, in a manner known per se, to each of the dead sectors. If this jacket sealing plate, in the same manner as the sealing plates previously described, is provided with outwardly projecting strips which rest against stationary strips on the housing jacket, then there will be no overflow of flue gases in that part of the intermediate chamber between the rotor jacket and the housing jacket, as shown in Fig. 1. The hollow chambers obtained through such jacket sealing plates, which would correspond to the hollow chambers 27, 27', 28 and 28', may then be employed, for instance to form an equalization connection between the upper chambers 27 and 28, on the one hand, and the lower chambers 27' and 28' on the other hand. If the jacket sealing plates are rigidly connected with the upper and the lower sector sealing plates they may at the same time take over the function of connecting rods 21 which then may be dispensed with.

In the embodiment with jacket sealing plates the outer chamber on the air side of the rotor will be entirely sealed off from the rest of the outer chamber. There is accordingly a double sealing, one being between the movable circumferential sealing system relative to the annular chamber between the rotor and the housing jacket and the other at the outer edges of the jacket sealing plates which seals on the gas side. This fact is of importance particularly for two-stage air preheaters since there is the possibility that at any place of the rotor, seen in the axial direction, gas may be admitted from the outside and air discharged, without the effect of the sealing being impaired therethrough.

Whereas in the above described embodiments the sealing plates located opposite one another are inter-connected by certain coupling members to form dead sectors, as for example shown in Fig. 1 or 4, by the aid of connecting rods 21 or by means of a jacket sealing plate. Fig. 5 shows a modified embodiment in which the coupling is provided by means of the rotor itself. The rotor is for this purpose at its two outer edges provided with two flange rings 29 and 30 which between them form a guiding groove 31. A replaceable guiding strip 32 extends into the guiding groove 31 and a bolt 33 is fixed to said strip 32. This bolt runs loosely through the outer end of the sealing plate 2 and carries an adjustable stop 34 against which the outer end of the sealing plate 2 is pressed by means of a spring 35. By means of this stop 34 the distance of the sealing plate 2 to the rotor end surface may be selectively adjusted to a desired minimum value, whereas the spring 35 permits the plate 2 to move outwardly on increasing the distance. At the lower end there are arranged corresponding members. Through this coupling by means of the rotor itself, special coupling members are dispensed with. Naturally this does not exclude a jacket sealing plate also being employed.

It will thus be understood that the basic idea of the invention, particularly in connection with the foregoing broader features disclosed in detail, results in a multiple and therefore particularly efficient sealing of the two channels, and moreover this construction is very simple, thus being cheap and safe in operation.

What is claimed:

1. A rotary regenerative heat exchanger for gaseous media of the character described, comprising a rotor and stationary housing structure, said housing structure including end plates at the respective ends of the rotor, each of said end plates having apertures therein providing for at least two channels for flow of different heat exchanging media through the heat exchanger, said rotor having radial partitions dividing the rotor into a plurality of sector-shaped compartments, rotationally stationary movable sealing plates located adjacent to each end of the rotor and between the ends of the rotor and the end plate at the corresponding end of the stationary structure, said sealing plates having apertures therein registering with the apertures in said end plates of the stationary housing structure for passage through the sealing plates of the heat exchanging media through said two channels to and from the rotor and being hingedly mounted adjacent to the axis of rotation of the rotor to permit movement thereof substantially axially on the perimeter of the rotor in conformity with axial distortion of the rotor at its perimeter, and sealing strips extending from each of said sealing plates and each of said end plates, said sealing strips extending around the perimeter of one of the apertures in each of said sealing plates and extending around the perimeter of the corresponding aperture in each of said end plates to provide a seal between said plates for confining the flow of the medium passing through the apertures with which the sealing strips are associated.

2. Structure as defined in claim 1 in which said apertures are of generally sector-shaped form and the sealing strips comprise generally radially extending portions converging toward and joined adjacent to the axis of the rotor and connected at their outer ends by arcuate portions located adjacent to the outer perimeter of the stationary structure.

3. Structure as defined in claim 2 in which the included angle of the apertures in the plates providing for one channel through the heat exchanger is less than the included angle of the apertures in the plates providing for the other channel through the heat exchanger, and said sealing strips encompass the perimeters of the apertures having the smaller included angle.

4. Structure as defined in claim 2 in which additional cooperating sealing strips are provided on both said sealing plates and said end plates, said sealing strips being peripherally spaced from the radial portions of the first mentioned strips and being generally radially arranged to converge and be joined together near the axis of the rotor, the outer ends of said additional sealing strips being connected to the first mentioned sealing strips by circumferential extensions of the circumferential portions of the first mentioned sealing strips.

5. Structure as defined in claim 4 in which closed chambers are formed by the first mentioned sealing strips and said additional sealing strips at each side of the apertures with which said sealing strips are associated, adjacent to each end of the rotor.

6. Structure as defined in claim 5 in which at least corresponding chambers at opposite ends of the rotor are interconnected.

7. Structure as defined in claim 1 including resilient sealing members secured to one of said plates at each end of the structure and bearing against the sealing strips on the other of said plates at the same end of the rotor for covering the slots between the cooperating sealing strips carried respectively by the end plates of the movable sealing plates.

8. Structure as defined in claim 7 in which the resilient sealing members are in the form of thin metal strips.

9. Structure as defined in claim 1 in which the movable sealing plates are axially interconnected at their outer ends externally of the rotor for movement permitting the sealing plates to follow distortion in axial direction at the circumference of the rotor.

10. Structure as defined in claim 9 including axially adjustable means for selectively adjusting the distance between the respectively interconnected sealing plates.

11. Structure as defined in claim 10 in which said adjustment means includes stops for determining the minimum axial distance between respectively interconnected sealing plates, and yieldable means for permitting the rotary outer ends of said respectively interconnected sealing plates to move axially away from each other.

12. Structure as defined in claim 9 in which the rotor is provided adjacent to each of its ends with a circumferentially extending groove, there being circumferentially extending plates received in said grooves and said plates being connected with the radially outer end portions of the respectively adjacent movable sealing plates, whereby the rotor provides the means for interconnecting the sealing plates at the opposite ends of the rotor.

13. Structure as defined in claim 12 in which the rotor is provided at each end with two axially spaced circumferentially extending flange rings to provide for forming the aforesaid circumferentially extending grooves.

14. Structure as defined in claim 12 including axially extending bolts carried by said movable sealing plates, said bolts having adjustable stops for limiting movement of the bolts in one direction and springs bearing on said adjustable sealing plates for yieldably holding the structures against said stops while permitting movement thereof away from the stops.

15. Structure as defined in claim 1 in which at least certain of the sealing strips on adjacent ones of said end plates and sealing plates are mounted in confronting axially spaced relation, the gaps between the confronting edges of the strips being closed by a diaphragm structure interposed between the confronting edges.

16. Structure as defined in claim 15 in which the diaphragm comprises yieldable sheet metal.

References Cited in the file of this patent

UNITED STATES PATENTS

| | | |
|---|---|---|
| 2,287,777 | Boestad | June 30, 1942 |
| 2,738,958 | Hodge | Mar. 20, 1956 |

FOREIGN PATENTS

| | | |
|---|---|---|
| 957,953 | France | Mar. 1, 1950 |